UNITED STATES PATENT OFFICE.

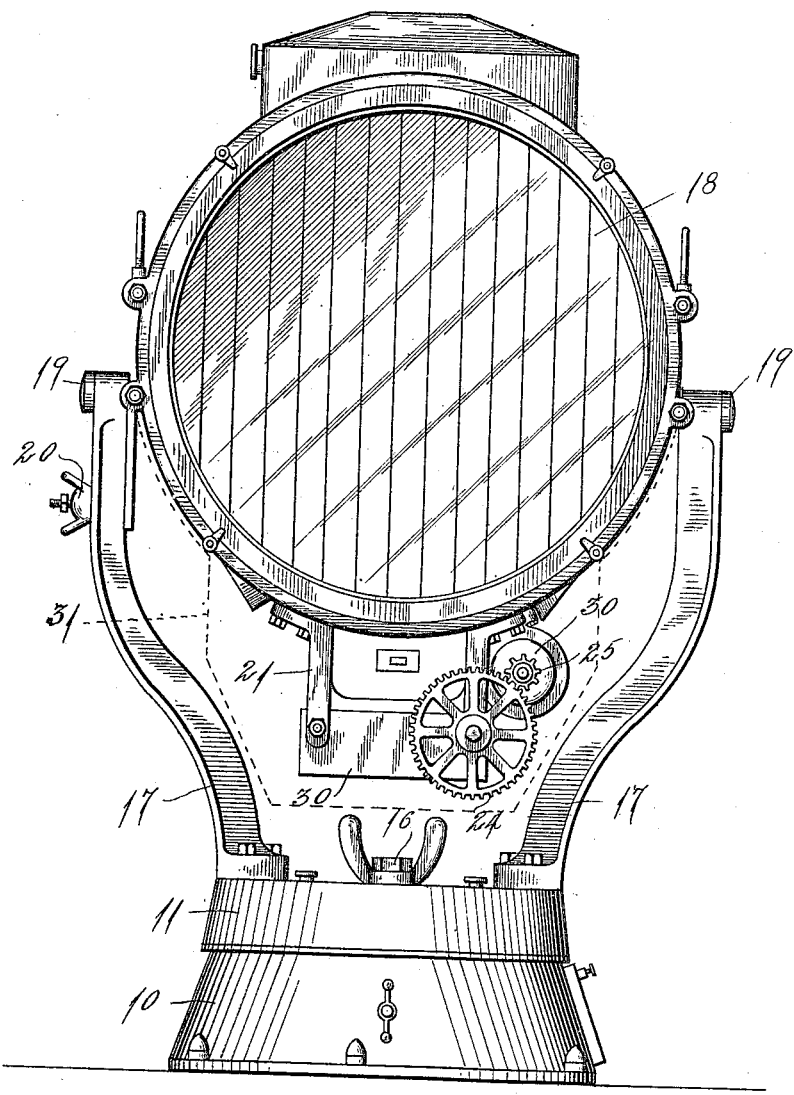

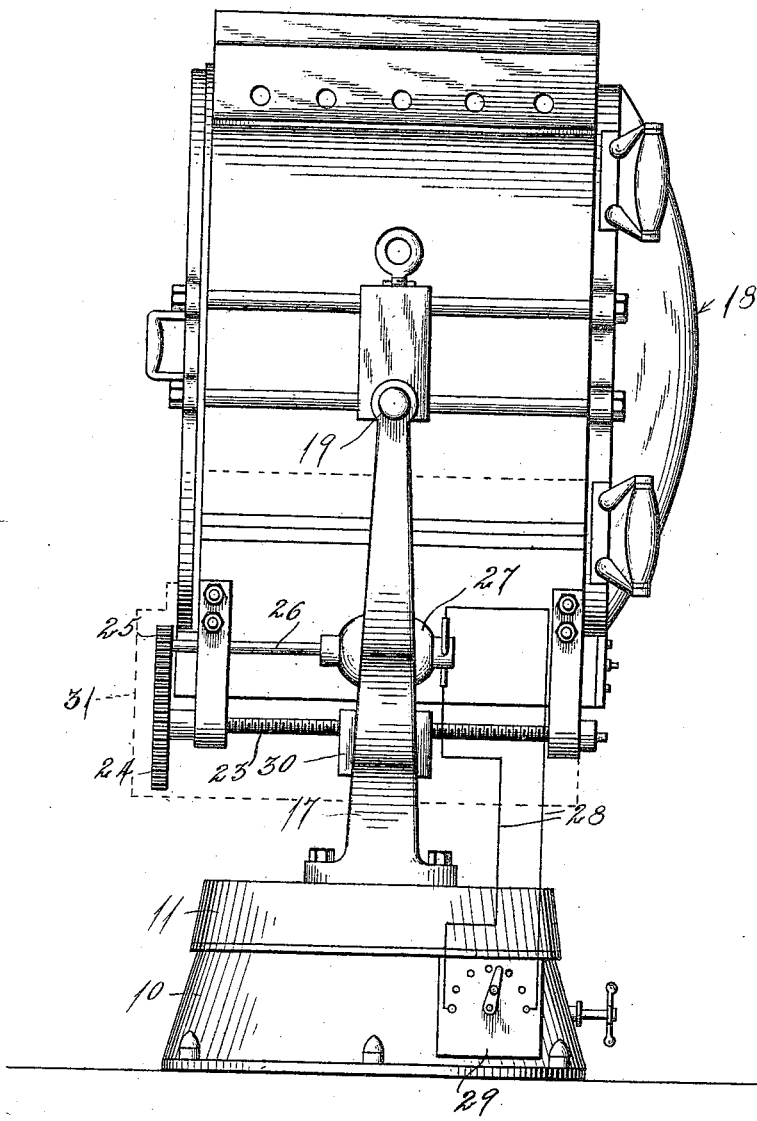

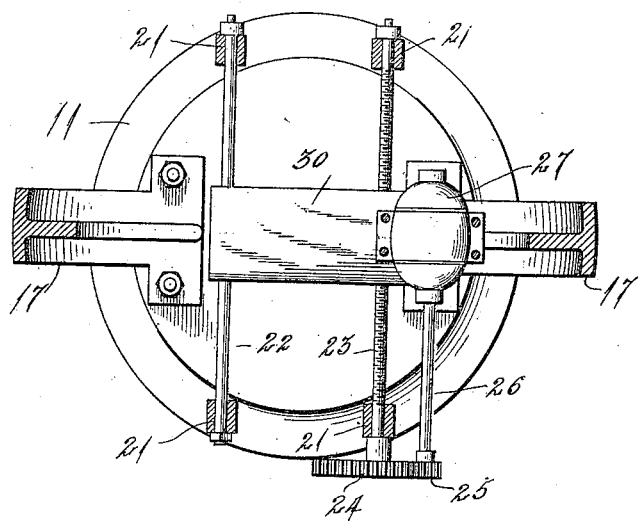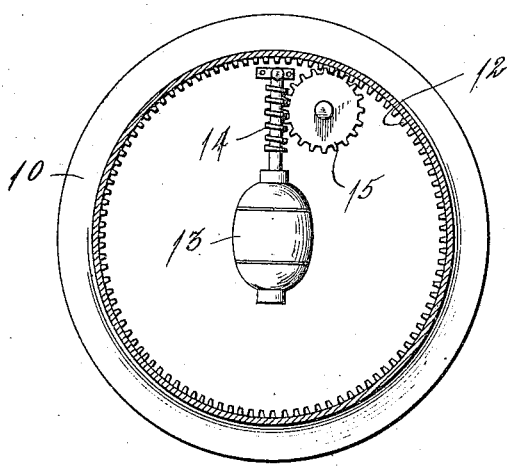

EUGENE A. EDMONDS, OF THE UNITED STATES NAVY.

SEARCH-LIGHT PROJECTOR.

993,971.	Specification of Letters Patent.	Patented May 30, 1911.

Application filed November 4, 1910. Serial No. 590,756.

*To all whom it may concern:*

Be it known that I, EUGENE A. EDMONDS, a citizen of the United States, residing on U. S. S. *California*, United States Navy, have invented certain new and useful Improvements in Search-Light Projectors; and I do hereby declare the following to be a full, clear, and exact description of the invention, such as will enable others skilled in the art to which it appertains to make and use the same.

This invention relates to search lights and has special reference to a novel form of projector for such devices.

It is a well understood fact that in using search lights at sea much difficulty is experienced on account of the rolling or pitching of the vessel in keeping the search light directed on the object desired to be illuminated by reason of the vertical oscillation of the beam.

The principal object of the present invention is to provide a search light in which the vertical angle of the beam with the horizontal may be varied at will while at the same time the beam may be held constantly on an object when the same is once picked up.

With the above and other objects in view the invention consists in general of a search light projector provided with a novel means to control the vertical angle of the beam with the horizontal.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a front elevation of a search light as constructed in accordance with this invention. Fig. 2 is a side elevation thereof. Fig. 3 is a horizontal section taken below the lantern of the search light. Fig. 4 is a horizontal section taken through the turntable.

This projector is provided with the usual base 10 whereon is positioned a turntable 11, the latter being provided with an internal gear 12. Within the base 10 is a motor 13 the shaft of which is provided with a worm 14 which meshes with a gear 15, the latter in turn meshing with the gear 12 so that by actuation of the motor the turntable may be rotated about a vertical axis. The turntable is held upon the base by the usual means as indicated by the bolt and nut 16. Secured at diametrically opposed points on the turntable 11 and projecting upwardly therefrom are arms 17, the two arms constituting a yoke. Between these arms is swung the usual lantern 18 which may be of any preferred form and construction and which is provided with the usual trunnions (not shown) fitted with the caps 19. By this means the lantern may be swung in a vertical plane and in order to prevent such swinging movement except when desired the usual lock 20 is provided.

Depending beneath the lantern are spaced pairs of brackets 21 each pair being arranged in alinement and one pair of said brackets serve to support a fixed rod 22 preferably of cylindrical cross-section. The remaining pair of the brackets 21 have journaled in their lower ends a screw 23 which carries at one end a gear 24. This gear 24 meshes with a pinion 25 carried on the shaft 26 of a motor 27, the latter being secured firmly beneath the lantern. From the motor 27 wires 28 extend to a controller 29 suitably positioned on the base 10 or at such other fixed point as may be found adapted for controlling the projector.

At 30 is a counterweight which is of oblong shape and which has through one end an opening adapted to fit and slide upon the rod 22 while the other end is provided with a threaded opening through which passes the screw 23. The counterweight is of sufficient width so that the movement of the screw 23 by the motor 27 will cause the counterweight to slide smoothly over the bar 22 and thus position the weight toward the rear or front of the machine as desired.

In the operation of the device the motor 13 is used to bring the beam in vertical alinement with the object and the controller 29 is manipulated to actuate the motor in one direction or the other so that the counterweight 30 is moved to incline the beam downward or upward according to the requirements of the case, the movement of the counterweight forward of the lantern causing the front end of the lantern to drop down and its backward movement causing the front end to rise with the consequent deflection of the beam in the same manner. It is to be understood that prior to doing this the lock 20 is released. If now the lock 20 be left released it will be obvious that the rolling of the vessel will not affect the direction of the beam to an appreciable extent by reason of the fact that the center of gravity of the combined lantern and counterweight will at all times remain directly beneath the axis of rotation passing through the trunnions so that when the object is once picked up in this manner the beam will remain constantly directed thereon.

There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described but it is wished to include all such as properly come within the scope of the appended claims.

It will be obvious that the moving parts such as the weights and gears may be protected by a hood or casing which is here indicated in dotted lines as at 31.

Having thus described the invention, what is claimed as new, is:—

1. In a search light projector, a yoke, a lantern mounted in said yoke to swing in a vertical plane, a counterbalance frame carried by said lantern, and a counterbalance movable along said frame.

2. In a search light projector, a yoke, a lantern mounted in said yoke to swing in a vertical plane, a counterbalance movable along said frame, and motor means to vary the position of the counterbalance on its frame.

3. In a search light projector, a yoke, a lantern mounted in said yoke to swing in a vertical plane, a rod carried by and extending longitudinally of said lantern, a screw journaled to said lantern and parallel to the rod, a counterweight having one end carried by said rod and the other end provided with a threaded opening through which said screw passes, a motor, and gearing connecting said motor and screw.

4. In a search light projector, the combination with a base, a turntable mounted thereon and means to rotate said turntable; of a pair of arms projecting upwardly at diametrically opposed points from said turntable, a lantern journaled to said arms to swing in a vertical plane, a rod fixed to said lantern, a screw journaled to said lantern and parallel to said rod, a counterweight having one end carried by said rod and the other end provided with a threaded opening through which said screw passes, a motor fixed to said lantern, and gearing connecting said screw and motor.

In testimony whereof, I affix my signature, in presence of two witnesses.

EUGENE A. EDMONDS.

Witnesses:
 JAMES MASON,
 CORA L. BLACK.

---

Copies of this patent may be obtained for five cents each, by addressing the "Commissioner of Patents Washington, D. C."